US008964346B2

(12) United States Patent
Doser et al.

(10) Patent No.: US 8,964,346 B2
(45) Date of Patent: Feb. 24, 2015

(54) SURGE ARRESTER

(71) Applicant: ABB Technology AG, Zürich (CH)

(72) Inventors: Bernhard Doser, Waldshut-Tiengen (DE); Lutz Gebhardt, Reinach (CH); Peter Dubach, Fislisbach (CH); Nils Weiss, Zürich (CH); Denis Buergi, Buchs (CH)

(73) Assignee: ABB Technology AG, Zurich (CH)

( * ) Notice: Subject to any disclaimer, the term of this patent is extended or adjusted under 35 U.S.C. 154(b) by 211 days.

(21) Appl. No.: 13/692,561

(22) Filed: Dec. 3, 2012

(65) Prior Publication Data

US 2013/0141830 A1 Jun. 6, 2013

(30) Foreign Application Priority Data

Dec. 2, 2011 (EP) .................................... 11191743

(51) Int. Cl.
*H02H 1/00* (2006.01)
*H02H 1/04* (2006.01)
*H02H 3/22* (2006.01)
(Continued)

(52) U.S. Cl.
CPC .. *H01C 7/10* (2013.01); *H01C 7/12* (2013.01); *H01C 7/123* (2013.01)
USPC .......................................... 361/117; 361/127

(58) Field of Classification Search
CPC ....... H02H 9/042; H02H 9/043; H01C 1/028; H01C 7/10
USPC ................................. 361/117, 118, 126, 127
See application file for complete search history.

(56) References Cited

U.S. PATENT DOCUMENTS 4,887,182 A * 12/1989 Sweet .......................... 361/117
5,159,697 A * 10/1992 Wirth ............................. 378/93
(Continued)

FOREIGN PATENT DOCUMENTS

CN 201 859 724 U 6/2011
DE 195 22 867 A1 1/1997
(Continued)

OTHER PUBLICATIONS

European Search Report for EP 11191743.1 dated Apr. 27, 2012.

*Primary Examiner* — Thienvu Tran
*Assistant Examiner* — Christopher Clark
(74) *Attorney, Agent, or Firm* — Buchanan Ingersoll & Rooney PC

(57) ABSTRACT

An exemplary surge arrester includes a housing with protection against electric shock. A voltage-limiting active part is arranged in the housing and has a stack of varistor elements formed as a varistor column. An electrical connection is arranged outside the housing and is electrically conductively connected to the varistor column for connecting a high-voltage installation. The electrically conductive connection between the varistor column and the electrical connection is a flexible high-voltage cable conductor. The high-voltage cable has a first section arranged in the interior of the housing and formed without a shield, and a second section arranged outside the housing and having cable insulation and an electrically conductive shield that surrounds the cable conductor. The high voltage cable is electrically conductively connectable first to the housing and second to an encapsulation. The housing accommodates an apparatus for damping oscillations which are introduced into the varistor column from the outside.

20 Claims, 2 Drawing Sheets

(51) Int. Cl.

| | |
|---|---|
| ***H02H 9/06*** | (2006.01) |
| ***H01C 7/10*** | (2006.01) |
| ***H01C 7/12*** | (2006.01) |

(56) References Cited

U.S. PATENT DOCUMENTS

| | | | | |
|---|---|---|---|---|
| 5,574,613 | A * | 11/1996 | Shirakawa et al. | 361/117 |
| 6,594,133 | B1 * | 7/2003 | Schmidt et al. | 361/117 |
| 7,450,363 | B2 * | 11/2008 | Hughes | 361/118 |
| 7,688,564 | B2 * | 3/2010 | Byrne | 361/111 |
| 2004/0057185 | A1 | 3/2004 | Barlage et al. | |
| 2005/0018374 | A1 * | 1/2005 | Anthony | 361/118 |

FOREIGN PATENT DOCUMENTS

| | | | |
|---|---|---|---|
| DE | 10 2007 027 411 | A1 | 12/2008 |
| EP | 1 083 579 | B1 | 3/2001 |
| EP | 1 383 142 | A1 | 1/2004 |

* cited by examiner

SURGE ARRESTER

RELATED APPLICATION

This application claims priority under 35 U.S.C. §119 to European Patent Application No. EP11191743.1 filed in Europe on Dec. 2, 2011. The content of which is hereby incorporated by reference in its entirety.

FIELD

The present disclosure relates to surge arresters, such as a surge arrester having a housing with protection against electric shock and a voltage-limiting active part arranged in the housing.

BACKGROUND INFORMATION

In known applications in the voltage range of up to 44 kV, a surge arrester with protection against electric shock can be in the form of a plug-type arrester. It can then be connected to a high-voltage installation with protection against electric shock that is intended to be protected from overvoltage, for example a gas-insulated switchgear assembly or a transformer, with the aid of a standardized plug-type connection. For installations which are operated in a higher voltage range, standardized electrical connections which can be in the form of a plug-type connection are at times not available.

Embodiments of the surge arrester with protection against electric shock of the abovementioned type are described in EP 1 083 579 B1, EP 1 383 142 B1 and DE 10 2007 027 411 A1. The surge arresters described each have a housing with protection against electric shock which is filled with insulating material and in which a voltage-limiting active part is arranged, which active part has a stack of varistor elements in the form of a column. The active part is connected to an electrical connection in the form of a plug-type part of a plug-type connection through the wall of the housing. This electrical connection is located outside the housing filled with insulating material and can therefore be connected to the plug-type part of a high-voltage installation likewise formed with protection against electric shock so as to form the plug-type connection.

CN 201859724 U describes a surge arrester with a pluggable embodiment that includes an arrester body, which is connected to an electrical connection in the form of a plug-type contact via a shielded, flexible cable. The plug-type contact is part of a plug-type part with an insulating part tapering away from the arrester body. During installation of the surge arrester, the arrester body can be positioned in virtually any desired manner in a small installation space and then the plug-type part can be set with a prestress in a plug-type connection with the aid of a tensioning apparatus.

SUMMARY

An exemplary surge arrester is disclosed comprising: a housing with protection against electric shock; a voltage-limiting active part, which is arranged in the housing and has a stack of varistor elements formed as a varistor column; and an electrical connection, which is arranged outside the housing and electrically conductively connected to the varistor column for connecting a high-voltage installation, wherein the electrically conductive connection between the varistor column and the electrical connection is in the form of a cable conductor of a flexible high-voltage cable, the high-voltage cable having a first section arranged in the interior of the housing and formed without a shield, and a second section arranged outside the housing, having cable insulation and an electrically conductive shield that surrounds the cable conductor, and is electrically conductively connectable to the housing and to an encapsulation with protection against electric shock of the high-voltage installation, and wherein the housing accommodates an apparatus for damping oscillations which are introduced into the varistor column from the outside.

BRIEF DESCRIPTION OF THE DRAWINGS

These and other features of the disclosure are disclosed in the description below of exemplary embodiments of the disclosure, in which reference is made to the following figures.

DETAILED DESCRIPTION

Figure 1:
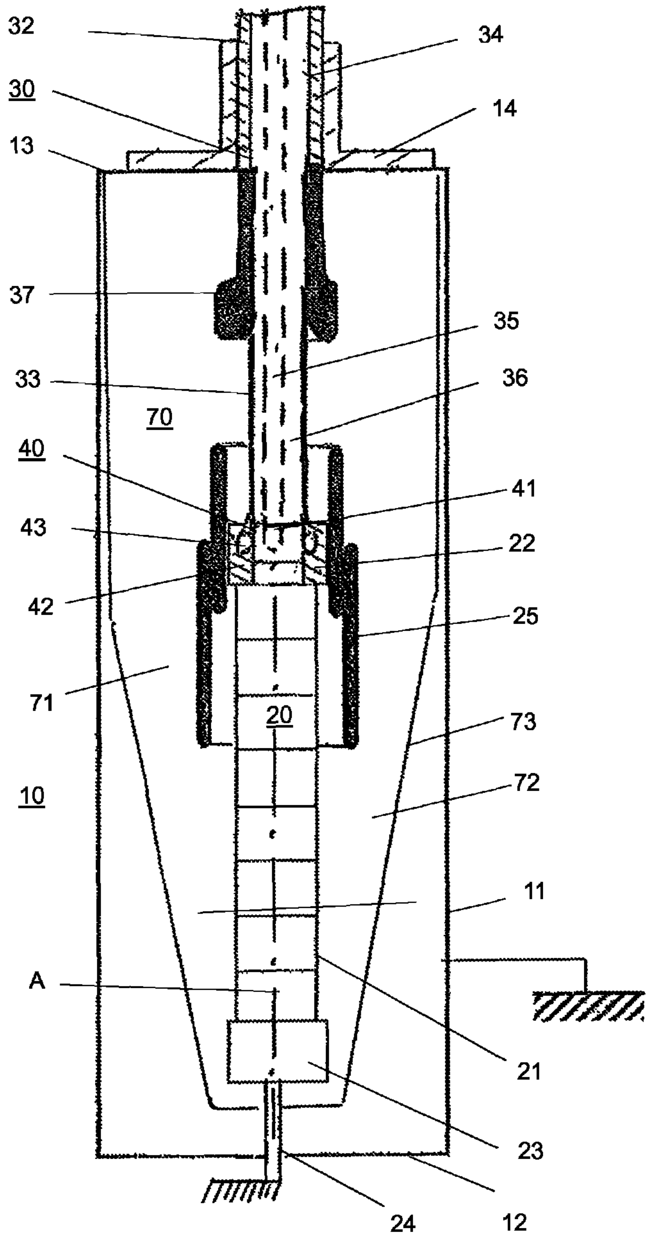
FIG. 1 shows a plan view of a section guided along an axis A through a surge arrester according to an exemplary embodiment of the present disclosure.

Exemplary embodiments of the present disclosure provide a surge arrester of the type mentioned at the outset which is characterized by a high degree of operational safety despite a small space specification.

An exemplary embodiment of the present disclosure provides a surge arrester having a housing with protection against electric shock, a voltage-limiting active part, which is arranged in the housing and has a stack of varistor elements formed as a varistor column, and an electrical connection, which is arranged outside the housing and electrically conductively connected to the varistor column for connecting a high-voltage installation which has protection against electric shock and is intended to be protected from overvoltage. The electrically conductive connection between the varistor column and the electrical connection is in the form of a cable conductor of a flexible high-voltage cable. The high-voltage cable has two cable sections, of which a first section, which is arranged in the interior of the housing, is formed without a shield, and a second cable section, which is arranged outside the housing, has an electrically conductive shield, which surrounds the cable conductor and cable insulation and is electrically conductively connectable firstly to the housing and secondly to an encapsulation, with protection against electric shock, of the high-voltage installation. The housing accommodates an apparatus for damping oscillations which are introduced into the varistor column from the outside.

According to an exemplary embodiment described herein, the electrical connection of a surge arrester can be positioned in virtually any desired manner with respect to the active part and therefore also with respect to the housing of the arrester. It can therefore be mounted and mechanically fixed in the vicinity of a stationary high-voltage installation at a freely selectable location in a space-saving manner. By virtue of suitable positioning of the electrical connection as a result of reversible deformation of the high-voltage cable, the electrical connection of the now stationary surge arrester can be electrically conductively connected to the high-voltage installation. It is thus possible for space to be saved. Impacts or oscillations which are produced outside the surge arrester, for example in the high-voltage installation, and which could represent an impermissibly high mechanical load on the surge arrester as bending force or oscillation are effectively reduced and possibly almost completely suppressed by means of the interaction of the flexible high-voltage cable and the damping apparatus on the varistor column containing the fragile ceramic varistor elements. Since the damping apparatus also effectively damps forces which are introduced from the outside directly into the housing and which are produced for example by mechanical loading of the housing or by earthquakes, the operational safety of the surge arrester is increased substantially.

Protection of the active part on all sides from impermissible mechanical loading is achieved when the damping apparatus has a damping body that has at least one incompressible material which is deformable in rubber-like fashion, said damping body embedding the varistor column. If the damping body has an insulator, insulating material which is otherwise called for between the active part and the housing can be dispensed with. Likewise, by applying an electrically conductive layer kept to the electrical potential of the housing to the surface of the insulator, the strong electrical field acting during operation of the arrester in the interior of its housing can then be controlled in a reliable manner, as a result of which the operational safety of the arrester is further increased.

In order to control the abovementioned strong electrical field, a ring-shaped first field control element is guided at least around the first cable section formed without a shield or the varistor column. In order to improve the operational safety, this field control element contains a material formed from a polymer matrix and a filler embedded in the matrix, said material having at least a dielectric constant of between 5 and 45 or a nonlinear current-voltage characteristic during loading with an electrical DC field or an electrical AC field of up to 100 Hz. In order to improve the damping response and therefore to further improve the operational safety, the material of the first field control element is incompressible and deformable in rubber-elastic fashion.

The first field control element can be guided around the varistor column and can be kept to the potential of the cable conductor embedded in the cable insulation. In order to improve the field control, a second field control element can be provided, which is guided around the first cable section and is kept to the potential of the housing.

The first field control element can also be guided around the first cable section and can be kept to the potential of the housing.

Operationally safe electricity transmission which is easy to produce is achieved with a plug-type connection arranged in the housing, said plug-type connection including a first plug-type contact which is electrically conductively connected to the cable conductor of the first cable section and a second plug-type contact which is electrically conductively connected to a connection fitting of the active part. Advantageously, the first plug-type contact or the second plug-type contact contains a contact tulip with at least one spiral contact.

By virtue of the fact that at least one of the varistor elements of the varistor column is in the form of a high-field element and has a residual voltage of at least 450 V/mm when a surge current of 10 kA having the waveform 8/20 μs is applied, the height of the varistor column can also be kept small in the case of surge arresters which are dimensioned for high rated voltages. As a result, the mechanical strength of the column at a predetermined rated voltage and correspondingly also the operational safety of the arrester are improved.

The high-voltage cable can have a third section of the high-voltage cable, which third section is formed without a shield and can be guided through the encapsulation into the interior, which is filled with an insulating material, of the high-voltage installation, and the electrical connection can be fitted at one free end of the third cable section and can be formed as connecting part for an electrical connection arranged in the insulating material of the high-voltage installation.

The electrical connection can be in the form of a plug-type contact, the plug-type contact can be part of a plug-type part of a cable plug-type connection to the high-voltage installation, said plug-type part having protection against electric shock and being kept to the potential of the housing, the plug-type part can have an elastically deformable insulating part, and a third field control element can be embedded in the insulating part, said third field control element being held to the potential of the housing and being guided in the form of a ring around a third section of the high-voltage cable, which third section is formed without a shield and can be guided into the encapsulation of the high-voltage installation.

FIG. 1 shows a plan view of a section guided along an axis A through a surge arrester according to an exemplary embodiment of the present disclosure. The surge arrester illustrated in FIG. 1 has a substantially cylindrical housing 10 which is aligned along an axis A. The housing is provided with protection against electric shock and is formed of a metal, such as aluminum, an electrically conductive polymer (e.g., plastic), for example a polyethylene filled with conductive carbon black, or an insulating material which is coated with an electrically conductive material, for example a metal or an electrically conductive polymer (e.g., plastic). The housing is only illustrated schematically and has a tubular jacket 11, with a base 12 attached to the lower end of said tubular jacket and a cover 13 attached to the upper end thereof.

Figure 2:
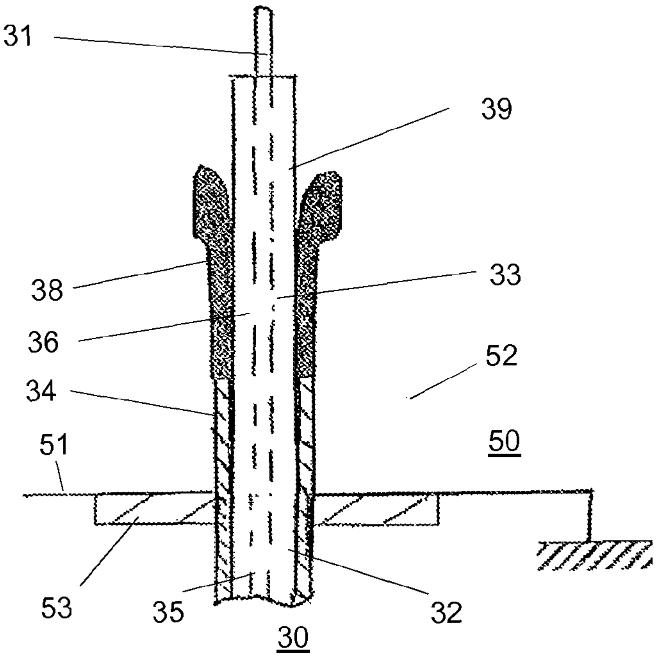
FIG. 2 shows a plan view of a section through a first connection point of a surge arrester shown to the high-voltage installation in accordance with an exemplary embodiment of the present disclosure.
Figure 3:
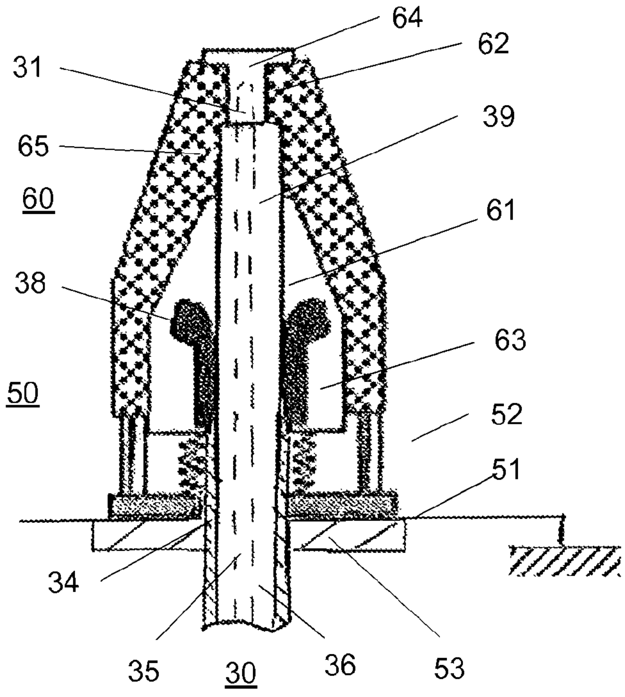
FIG. 3 shows a plan view of a section through a second connection point of a surge arrester to the high-voltage installation in accordance with an exemplary embodiment of the present disclosure.

A columnar active part 20 aligned in the direction of the axis A is arranged in the interior of the housing 10. As described in the prior art cited at the outset, the active part 20 contains a stack of varistor elements in the form of a column 21, for example on the basis of metal oxide, such as ZnO, and metal fittings 22 and 23 which terminate the active part 20 at the top and at the bottom, respectively, and a tensioning apparatus (not illustrated), which tensions the two metal fittings and therefore also the individual varistor elements so as to form contact force with respect to the varistor column 21. The metal fitting 23 is connectable to ground potential via an electrical conductor 24 which is passed, possibly insulated, out of the housing 10. The metal fitting 22 is electrically conductively connected to a cable conductor 35 of a flexible high-voltage cable 30, which is guided to the outside through a wall section of the housing 10 defined by the cover 13, with an electrical connection 31, which is arranged outside the housing and is illustrated in FIGS. 2 and 3, via a plug-type connection 40.

As can be seen from FIG. 1, the high-voltage cable 30 has a cable section 32, which is guided out of the housing 10 and is shielded by a cable shield 34, and a cable section 33, which is arranged in the interior of the housing 10. The shield 34 can include an elastically deformable metal jacket and a conductive cable layer, which is fitted on cable insulation 36 embedding the cable conductor 35. As shown in FIG. 1, the shield 34 is electrically conductively connected to the housing 10 which is kept at ground potential. The connection is achieved by means of a flange 14, which is arranged centrally on the cover 13 and through which the high-voltage cable 30 is guided in a gas-tight manner into the interior of the housing 10. Protection against electric shock of the cable section 32, which is arranged outside the housing and is formed with a shield, is thus achieved. The section 33 is kept free from the shield 34 and substantially includes the cable conductor 35 and cable insulation 36 enveloping the cable conductor. FIG. 1 shows that the lower end of the cable conductor 35 is fastened electrically conductively in a plug-type part 41, in the form of a contact pin, of the plug-type connection 40. A plug-type part 42, which is integrated in the connection fitting 22, is in the form of a contact tulip and has a spiral contact 43 making contact with the contact pin, said spiral contact consisting of a spring wire wound in the manner of a circular torus.

A field control element 25, which controls the electrical field acting between the varistor column 21 and the tubular jacket 11 which is at ground potential during operation of the arrester, is also arranged in the interior of the housing 10. The field control element is electrically conductively connected to the metal fitting 22 and is therefore at the electrical potential of the cable conductor 35. It has a substantially axially symmetrical design and is guided in the form of a ring around the varistor column 21. In addition to an electrode kept to the potential of the cable conductor 35, it is also possible for further metal layers which are kept electrically insulated from this electrode or electrically conductive polymer (e.g., plastic) layers to be included, which layers are guided substantially in a coaxial arrangement around this electrode. During operation of the arrester, this field control element shields varistor elements which are subjected to a strong electrical field.

The control of the electric field between the non-shielded section 33 of the high-voltage cable 30 and the housing 10 is achieved with a ring-shaped field control element 37 which is kept to the electrical potential of the housing 10. This field control element is electrically conductively connected to the cover 13 and can therefore be at ground potential, as is the housing 10. The field control element 37 can have the same construction as the field control element 24 and is guided substantially axially symmetrically around the non-shielded cable section 33.

As shown in FIGS. 2 and 3, the electrical connection 31 serves to electrically connect a stationary high-voltage installation 50 which is intended to be protected from overvoltage and has an encapsulation 51 with protection against electric shock, which encapsulation is filled at least with a gaseous, liquid or solid insulating material 52, such as a gas-insulated encapsulated switchgear assembly or an apparatus filled with insulating material, such as a transformer filled with insulating oil. If a high voltage present at the high-voltage installation 50 exceeds a defined value, the active part 20 limits the applied voltage to this value. Then, a discharge current flows to ground in a circuit containing the electrical connection 31, the cable conductor 35, the active part 20 and the electrical conductor 24.

FIG. 2 shows a plan view of a section through a first connection point of a surge arrester shown to the high-voltage installation in accordance with an exemplary embodiment of the present disclosure. As illustrated in FIG. 2, the electrical connection 31, which is arranged at the free end of the shield-free cable section 33, can be in the form of a connecting part for an electrical connection arranged in the interior of the encapsulation 51 filled with insulating material, e.g., in the insulating material 52. Such an electrical connection is implemented advantageously during manufacture of the high-voltage installation 50, for example by means of a screw connection, which directly electrically conductively fixes the electrical connection 31 guided into the interior of the encapsulation 51 at an electrical connection of an active part (not illustrated) of the high-voltage installation 50. In this case, the shielded section 32 of the high-voltage cable is guided into the interior of the encapsulation 51 in a gas-tight manner and is held there with the aid of a flange 53 arranged on the encapsulation 51. A field control element 38 which is kept to the electrical potential of the cable shield 34 as well as the encapsulation 51 electrically conductively connected thereto serves the purpose of controlling the electrical field acting in the interior of the encapsulation 51 between a section 39 of the high-voltage cable 30 which is kept free from the shield 34 and the encapsulation 51. Such a connection can be produced using comparatively simple means and is characterized by a high degree of operational safety.

FIG. 3 shows a plan view of a section through a second connection point of a surge arrester to the high-voltage installation in accordance with an exemplary embodiment of the present disclosure. As illustrated in FIG. 3, the electrical connection 31 arranged at the free end of the shield-free cable section 33 can also be integrated in one of two plug-type parts 61, 62 of a cable plug-type connection 60. The electrical connection 31 illustrated by dashed lines is in the form of a contact pin, as can be seen, and is part of the plug-type part 61 in the form of a plug. This plug-type part has an elastically deformable, insulating part 63, which ensures the high-voltage insulation between the plug-type contact 31 and the shield 34 of the cable section 32 or the encapsulation 50. The ring-shaped field control element 38 which is kept to the potential of the housing 10 is embedded in the insulating part 63.

During connection, the plug-type part 61 containing the electrical connection 31 with the electrical connection 31 in the form of a plug-type contact is first guided through an opening (not denoted) in the electrically conductive, grounded encapsulation 51 of the high-voltage installation 50 into the plug-type part 62, which is in the form of a plug-type socket, as can be seen. This plug-type part has a plug-type contact 64 in the form of a tulip an insulating part 65. When the plug-type part 61 is introduced into the installation 50 or into the plug-type socket 62, the two insulating parts 63, 65 are elastically deformed at conical resting faces to such an extent that no air gap remains between said insulating parts in a dielectrically advantageous manner. Instead of an inner cone formed by the two conical resting faces, the plug-type connection can also have an outer cone.

An advantage of the plug-type connection 60 finds that voltage-withstand tests on the high-voltage installation can be implemented in a simple manner in situ. Once the plug-type part 61 has been removed, a test voltage can be applied at the plug-type part 62 and then different voltage-withstand tests can be implemented easily.

During installation of the surge arrester in the high-voltage installation 50, the surge arrester is first fixed mechanically at a suitable location and then the electrical connection 31 is electrically conductively connected to an electrical conductor of the high-voltage installation 50. Since the electrical connection can be positioned virtually as desired owing to elastic deformation of the high-voltage cable 30 with respect to the housing 10, the arrester can be mounted and mechanically fixed in a space-saving manner in the vicinity of the stationary high-voltage installation at a freely selectable location.

Forces brought about by severe bending or excessive oscillatory movements of the high-voltage cable and transmitted from the cable section 32 to the cable section 33 are damped by an apparatus 70 arranged in the interior of the housing 10. This damping apparatus contains a damping body 71 embedding the varistor column 21 and including at least one incompressible material which can be deformed in rubber-like fashion.

The damping body 71 has an insulator 72 filling the majority of the housing 10. This insulator contains an elastomer, possibly filled with one or more additives, such as silicone or EPDM. The insulator 72 embeds the active part 20 and electrically insulates it from the housing 10. A layer 73 consisting of an electrically conductive material, such as conductive paint, which layer is applied to the surface of the insulator 72 and is kept to the electrical potential of the housing, ensures that it is not possible for an electrical field to be built up between the insulator 72 and the housing 10.

Mechanical forces emanating from the high-voltage installation 50, which could mechanically load the surge arrester to an impermissible extent, for example as bending force or oscillation, are effectively reduced by the interaction of the flexible high-voltage cable 30 and the damping apparatus 70 and are then almost completely suppressed at the varistor column 21 containing the fragile ceramic varistor elements. Since the damping apparatus 70 also effectively damps forces introduced from the outside directly into the housing 10 which are produced, for example, by mechanical loading of the housing or by earthquakes, the operational safety of the surge arrester is increased substantially.

An improvement in the damping and therefore a further increase in the operational safety is achieved in that the field control elements 25 and 37 are embedded in the insulator 72. According to exemplary embodiments of the present disclosure, effective damping can be achieved when the field control elements, which can be formed from metal, are formed from an incompressible material which can deform in rubber-like fashion, said material containing a polymer matrix and a filler embedded in the matrix, and which has at least a dielectric constant of between 5 and 45 or a nonlinear current-voltage characteristic in the event of loading with an electrical DC field or an electrical AC field of up to 100 Hz. Suitable fillers can be conductive carbon black, titanates, such as barium titanate, or microvaristors, such as metal-oxide-doped and sintered zinc oxide. Since the breaking load of the varistor column 21 increases considerably as the column length increases, the forces emanating from the high-voltage installation 50 or produced in another way are damped effectively in surge arresters which have a comparatively high varistor column 21 and are dimensioned for voltages of over 44 kV, and in another exemplary embodiment over 100 kV.

By virtue of the fact that at least one of the varistor elements of the varistor column 21 is a so-called high-field element, e.g., a varistor element which has a residual voltage of at least 450 V/mm in the event of loading with a surge current of 10 kA with the waveform 8/20 μs, the varistor column 21 is additionally shortened and thus the operational safety of the arrester is further increased.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 housing
11 tubular jacket
12 base
13 cover
14 flange
20 active part
21 varistor column
22, 23 metal fittings
24 electrical conductor
25 field control element
30 high-voltage cable
31 electrical connection, plug-type contact
32 shielded cable section
33 shield-free cable section
34 shield
35 cable conductor
36 cable insulation
37, 38 field control element
39 shield-free cable section
40 plug-type connection
41, 42 plug-type parts
43 spiral contact
50 high-voltage installation
51 encapsulation
52 insulating material
53 flange
60 plug-type connection
61, 62 plug-type part
63 insulating part
64 plug-type contact
65 insulating part
70 damping apparatus
71 damping body
72 insulator
73 electrically conductive layer
A axis

What is claimed is:

1. A surge arrester comprising:

a housing with protection against electric shock;

a voltage-limiting active part, which is arranged in the housing and has a stack of varistor elements formed as a varistor column; and an electrical connection, which is arranged outside the housing and electrically conductively connected to the varistor column for connecting a high-voltage installation, wherein the electrically conductive connection between the varistor column and the electrical connection is in the form of a cable conductor of a flexible high-voltage cable, the high-voltage cable having a first section arranged in the interior of the housing and formed without a shield, and a second section arranged outside the housing, having cable insulation and an electrically conductive shield that surrounds the cable conductor, and is electrically conductively connectable to the housing and to an encapsulation with protection against electric shock of the high-voltage installation, and wherein the housing accommodates an apparatus for damping oscillations which are introduced into the varistor column from the outside.

2. The surge arrester as claimed in claim 1, wherein the damping apparatus has a damping body including at least one incompressible material which is deformable in rubber-like fashion, said damping body embedding the varistor column.

3. The surge arrester as claimed in claim 2, wherein the damping body has an insulator.

4. The surge arrester as claimed in claim 3, wherein an electrically conductive layer kept at an electrical potential of the housing is applied to the surface of the insulator.

5. The surge arrester as claimed in claim 1, wherein a ring-shaped first field control element is guided at least around the first cable section or the varistor column.

6. The surge arrester as claimed in claim 5, wherein the first field control element contains a material formed from a polymer matrix and a filler embedded in the matrix, said material having at least a dielectric constant of between 5 and 45 or a nonlinear current-voltage characteristic during loading with an electrical DC field or an electrical AC field of up to 100 Hz.

7. The surge arrester as claimed in claim 5, wherein the material of the first field control element is incompressible and deformable in rubber-elastic fashion.

8. The surge arrester as claimed in claim 6, wherein the material of the first field control element is incompressible and deformable in rubber-elastic fashion.

9. The surge arrester as claimed in claim 5, wherein the first field control element is guided around the varistor column and is kept at the potential of the cable conductor embedded in the cable insulation.

10. The surge arrester as claimed in claim 6, wherein the first field control element is guided around the varistor column and is kept at the potential of the cable conductor embedded in the cable insulation.

11. The surge arrester as claimed in claim 7, wherein the first field control element is guided around the varistor column and is kept at the potential of the cable conductor embedded in the cable insulation.

12. The surge arrester as claimed in claim 9, wherein a second field control element is provided, which is guided around the first cable section and is kept at the potential of the housing.

13. The surge arrester as claimed in claim 10, wherein a second field control element is provided, which is guided around the first cable section and is kept at the potential of the housing.

14. The surge arrester as claimed in claim 11, wherein a second field control element is provided, which is guided around the first cable section and is kept at the potential of the housing.

15. The surge arrester as claimed in claim 5, wherein the first field control element is guided around the first cable section and is kept at the potential of the housing.

16. The surge arrester as claimed claim 1, wherein a plug-type connection is provided in the housing, said plug-type connection comprising a first plug-type contact which is electrically conductively connected to the cable conductor of the first cable section and a second plug-type contact which is electrically conductively connected to a connection fitting of the active part.

17. The surge arrester as claimed in claim 16, wherein the first plug-type contact or the second plug-type contact contains a contact tulip with at least one spiral contact.

18. The surge arrester as claimed in claim 1, wherein at least one of the varistor elements of the varistor column has a residual voltage of at least 450 V/mm when a surge current of 10 kA having the waveform 8/20 μs is applied.

19. The surge arrester as claimed in claim 1, wherein the high-voltage cable has a third section of the high-voltage cable, which third section is formed without a shield and is guided through the encapsulation into the interior of the high-voltage installation, which is filled with an insulating material, and the electrical connection is fitted at one free end of the third cable section and is formed as a connecting part arranged in the insulating material of the high-voltage installation.

20. The surge arrester as claimed in claim 1, wherein the electrical connection is in the form of a plug-type contact, in that the plug-type contact is part of a plug-type part of a cable plug-type connection to the high-voltage installation, said plug-type part having protection against electric shock and being kept to a potential of the housing, wherein the plug-type part has an elastically deformable insulating part, and wherein a third field control element is embedded in the insulating part, said third field control element being held to the potential of the housing and being guided in the form of a ring around a third section of the high-voltage cable, which third section is formed without a shield and is guided into the encapsulation of the high-voltage installation.

* * * * *